Figure 5:
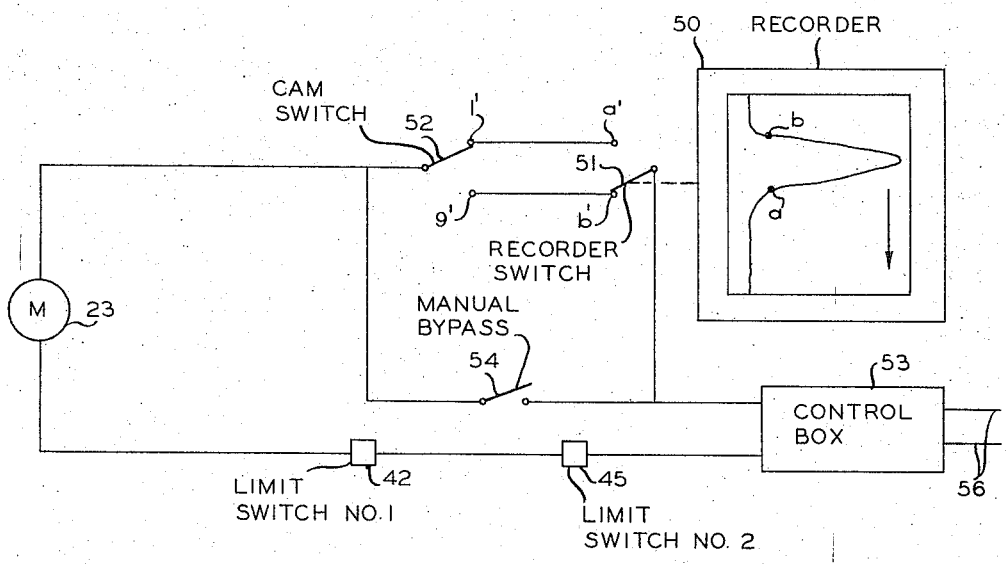

Feb. 28, 1967 J. A. FAVRE 3,306,347
FLUID STORAGE METHOD AND APPARATUS THEREFOR
Filed May 23, 1963
4 Sheets-Sheet 1
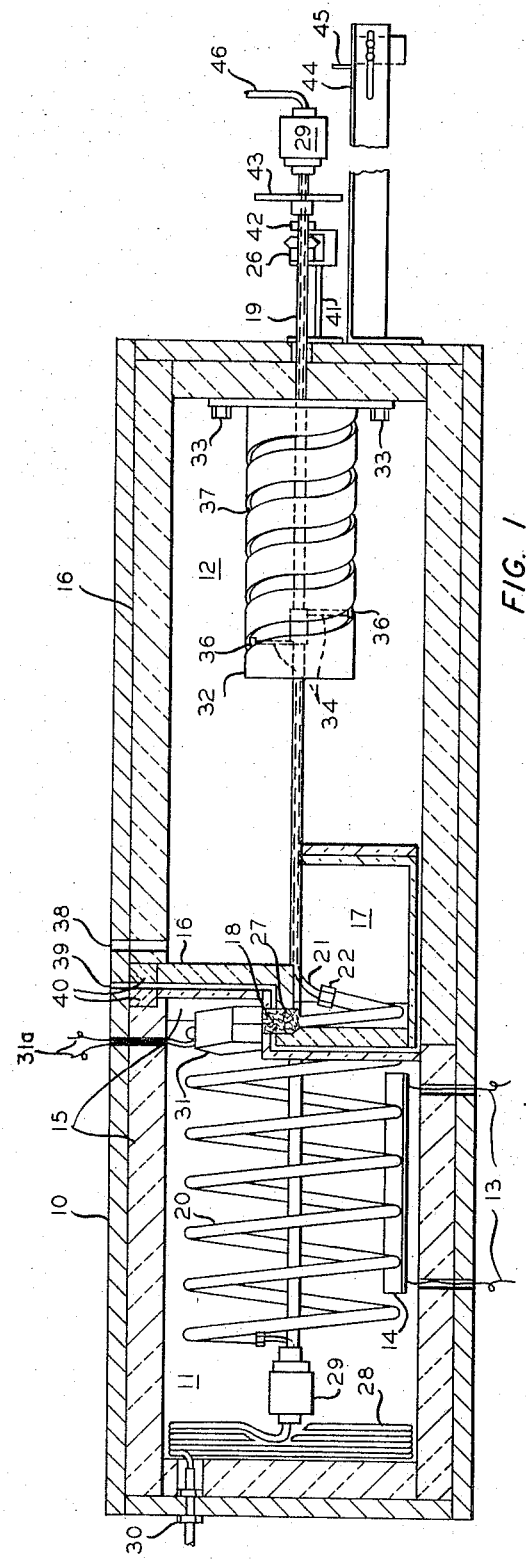
INVENTOR.
J. A. FAVRE
BY
*Young + Quigg*
ATTORNEYS Feb. 28, 1967    J. A. FAVRE    3,306,347
FLUID STORAGE METHOD AND APPARATUS THEREFOR
Filed May 23, 1963    4 Sheets-Sheet 3

INVENTOR.
J. A. FAVRE
BY *Young & Zugg*
ATTORNEYS

Feb. 28, 1967  J. A. FAVRE  3,306,347
FLUID STORAGE METHOD AND APPARATUS THEREFOR
Filed May 23, 1963  4 Sheets-Sheet 4

INVENTOR.
J. A. FAVRE
BY *Young & Quigg*
ATTORNEYS

United States Patent Office 3,306,347
Patented Feb. 28, 1967

3,306,347
FLUID STORAGE METHOD AND APPARATUS THEREFOR
John A. Favre, Bartlesville, Okla., assignor to Phillips Petroleum Company, a corporation of Delaware
Filed May 23, 1963, Ser. No. 282,672
11 Claims. (Cl. 165—2)

This invention relates to the storage of fluids. In another aspect, this invention relates to a method of and apparatus for storing separate vaporous constituents in a storage vessel and transmitting said separate vaporous constituents from said storage vessel, said storing and transmitting conducted without mixing the said separate vaporous constituents.

A method of measuring the concentration of constituents of a fluid stream involves the use of a chromatographic analyzer. In elution chromatography, a vapor sample of the mixture to be analyzed is introduced into a column containing a selective sorbent or partitioning material. A carrier gas is directed into the column so as to force the sample therethrough. The selective sorbent, or partitioning material, attempts to hold the constituents of the feed mixture. This results in the several constituents of the fluid mixture flowing through the column at different rates of speed, depending upon their affinities for the packing material. The column effluent thus consists initially of the carrier gas alone, the individual constituents of the fluid mixture appearing later at spaced time intervals. A conventional method of determining the presence and concentration of these constituents is to employ a thermal conductivity detector which compares the thermal conductivity of the effluent gases with the thermal conductivity of the carrier gas directed to the column.

It is desirable, in some cases, that the separated components eluted from a chromatographic column be further examined by a mass spectrometer. Present methods of handling the separated components eluted from the chromatographic analyzer, particularly when the chromatographic analyzer and mass spectrometer are at different locations, so as to permit examination of the peaks with the proper timing and concentration are highly unsatisfactory.

Accordingly, an object of my invention is to provide an improved method of and apparatus for storing separate vaporous constituents without mixing the said vaporous constituents.

Another object of my invention is to provide an improved method of and apparatus for storing chromatographic peaks.

Other objects, advantages and features of my invention will be readily apparent to those skilled in the art from the following description, appended claims and drawings.

The "storing" of vaporous constituents, as herein employed, includes, in addition to storage in a storage zone, the method of and apparatus for introducing the said vaporous constituents into the said storage zone and for transmitting said vaporous constituents from the said storage zone.

Briefly, my invention comprises a method of and apparatus for trapping separate vaporous constituents in a coiled tube, reducing the vapor pressure of the said constituents to prevent the mixing of the said separate constituents within the coiled tube, and transmitting the said vaporous constituents from said tube so as to prevent the mixing of the said vaporous constituents.

Figure 4:
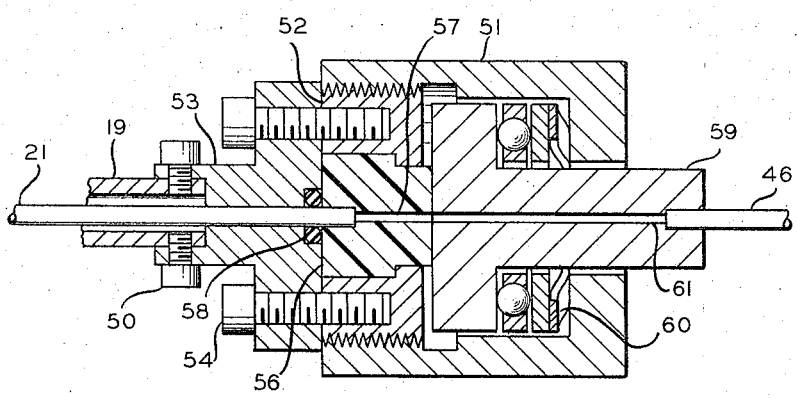
Figure 6A:
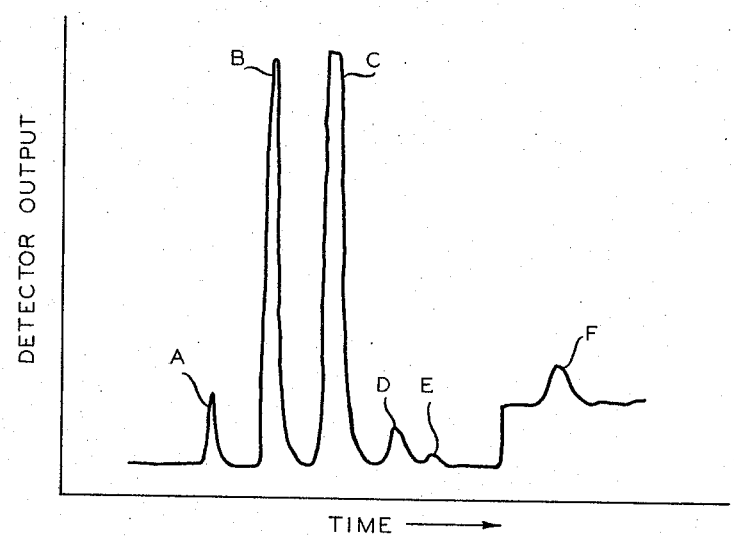
Figure 6B:
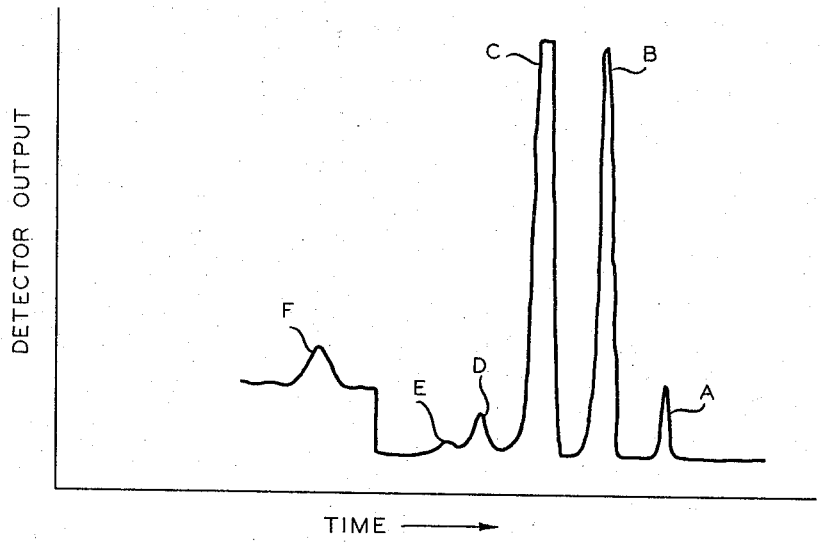
Figure 7B:
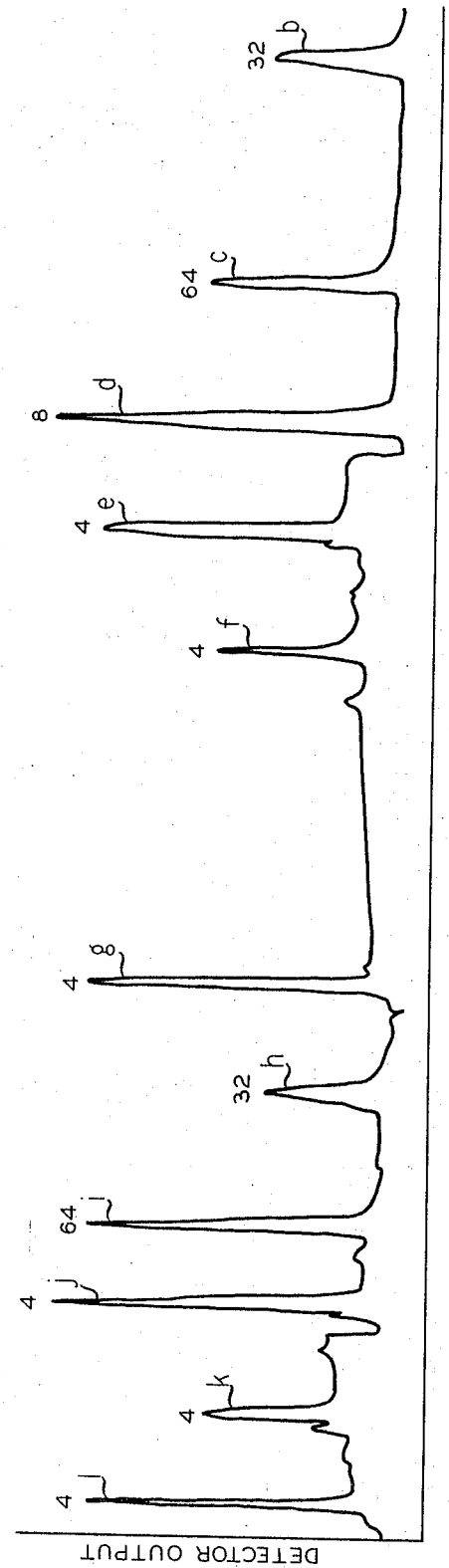
Figure 7A:
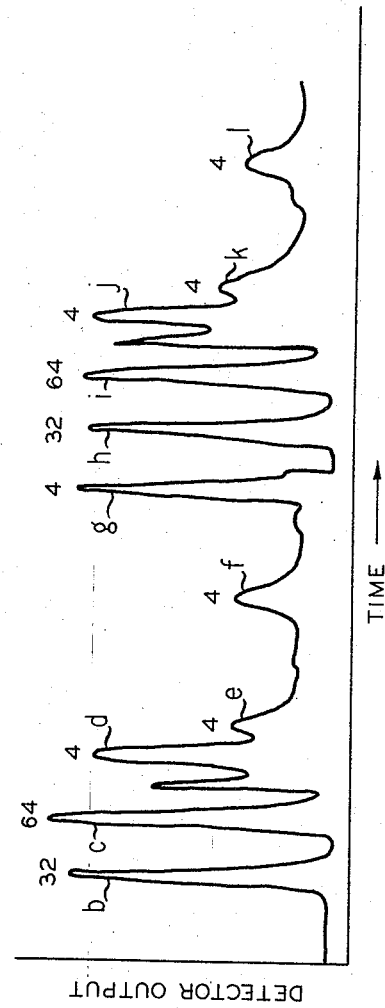

In the drawings:
FIGURE 1 is a cross-sectional view of the inventive apparatus taken along the lines 1—1 of FIGURE 2.
FIGURE 2 is a side elevation view of the inventive apparatus of FIGURE 1.
FIGURE 3 illustrates apparatus whereby the position of individual vaporous constituents within the storage apparatus can be determined.
FIGURE 4 is a cross-sectional view of the coupling apparatus of FIGURE 1.
FIGURE 5 is a schematic representation of one embodiment of a method of automatically controlling the storage of vaporous constituents.
FIGURES 6a and 6b illustrates the effectiveness of one embodiment of the invention.
FIGURES 7a and 7b illustrate the effectiveness of a second embodiment of the invention.

Referring to FIGURE 1, a storage case or container 10 encloses a heating compartment 11 and a refrigeration compartment 12. Compartment 11 is lined with a conventional heat-insulating material 15 such as Cerafelt, manufactured by Johns-Manville. Compartment 11 is provided with a conventional means of heating compartment 11 such as an electrical heating element 14 to which an electrical current is directed via lead wires 13.

Compartment 12 is lined with a conventional cold-insulating material 16 such as Styrofoam, manufactured by Dow Chemical Company of Midland, Michigan. Compartment 12 contains an inner compartment 17 positioned immediately adjacent to an opening 18 connecting compartments 11 and 12.

Extending into compartments 11 and 12 is a rotating shaft 19. Attached to rotating shaft 19 and in fixed relationship to said shaft 19 is a helical-shaped tube 20 containing an inert packing material such as Celite. Other suitable packing materials are glass beads, firebrick, or granular Teflon (tetrafluoroethylene). A conduit tube 21 is positioned within rotating shaft 19 and in fixed relationship to rotating shaft 19. Conduit tube 21 is attached to and in communication with helical tube 20 via a conventional connecting means 22. Shaft 19 is rotated and laterally repositioned by a motor 23 (FIGURE 2). Motor 23 is operably connected to shaft 19 by means of mitered gears 24 and 26. As illustrated, shaft 19 has been moved laterally to the left such that coil 20 is substantially within chamber 11. The direction of rotation of miter gear 24 can be reversed, thereby reversing the rotation of miter gear 26 and shaft 19. Upon reversing the rotation of shaft 19, shaft 19 is moved laterally to the right—away from storage case 10—rotating coil 20 through opening 18 and into chamber 12. Opening 18 contains insulating material such as Fiberglas insulation 27 through which coil 20 is moved, insulation 27 substantially preventing the transference of heat between compartments 11 and 12 through opening 18.

A flexible helical-shaped, hollow coil 28 is attached to rotating shaft 19 and is in communication with coil 20 via a coupling means 29, said coupling means 29 more particularly hereinatfer described. Flexible coil 28 is attached to and in communication with a conduit inlet means 30 passing through and in fixed relationship with storage case 10. As shaft 19 is rotated and moved laterally to the right—away from storage case 10—flexible coil 28 is extended through compartment 11, remaining attached to conduit means 30 and shaft 19 through coupling means 29.

A block heater 31 is positioned around coil 20 and immediately adjacent to opening 18 such that coil 20 upon passing from compartment 12 to compartment 11 and from compartment 11 to compartment 12 is moved through the heater. As illustrated, heater 31 is an electrical heater to which an electrical current is passed via lead wires 31a. The operation of heater 31 is hereinafter desribed.

To aid in the rotation of shaft 19 and the lateral movement of shaft 19, a shaft advancing spiral means 32 is provided within compartment 12. Shaft advancing spiral means 32 is attached to storage case 10 via conventional bolting means 33. Fingers 34, operably attached to and in fixed relationship to shaft 19, extend outwardly from shaft 19. Rollers 36, operably attached to fingers 34, are positioned within spiral groove 37 of shaft advancing spiral means 32. Upon rotating and laterally moving shaft 19, rollers 36 move through the spiral groove 37 exerting a rolling pressure upon spiral means 32, thereby enabling shaft advancing spiral means 32 to support rotating shaft 19 as said shaft 19 is rotated and moved laterally.

Compartment 12 is cooled by passing liquid nitrogen through a filler opening 38 into compartment 17. During periods of operation, opening 38 will be closed. It is within the scope of this invention to employ other means of cooling compartment 12. For example, Dry Ice or ice can be placed within compartment 17. The type of refrigerant employed will, of course, depend upon the temperature desired within compartment 17 and the remainder of compartment 12. Compartment 12 is vented by means of a passageway 39 in communication with compartment 12 and extending upwardly between compartments 11 and 12. By venting compartment 12 in this manner, an additional insulating effect is produced.

To prevent the top cover of case 10 from exerting a pressure upon the Cerafelt and Styrofoam linings so as to compress the linings and thus block passage 39, a rigid material 40, such as Transite manufactured by Johns-Manville of New York, New York, is placed on either side of opening 39 immediately adjacent to the top cover of case 10.

Miter gear 26 and shaft 19 are supported by a brace or support means 41 (FIGURE 2). An indexing wheel means 43 is positioned in fixed relationship to and operably connected to rotating shaft 19. A limit switch 42, such as a conventional microswitch, is attached to support means 41 and connected to motor means 23. Upon the rotation and lateral movement of shaft 19 into case 10, limit switch 42 operates to shut off motor 23 when indexing means 43 is brought into contact with switch 42, at which point coil 20 is substantially within compartment 11.

The position of coil 20 within case 10 is determined by a gauge means 44 attached to case 10 and marked as illustrated in FIGURE 3. As illustrated, one complete revolution of shaft 19 will move indexing means 43 laterally, for example, from position 7 to position 6, indicating the lateral distance moved by shaft 19. A second limit switch 45 is connected to motor means 23 and so positioned that upon the rotation and lateral movement of shaft 19 to the right—away from case 10—switch 45 will operate to shut off the motor when coil 20 has moved from compartment 11 and is substantially within compartment 12.

Motor 23 can be started and stopped manually; it is also within the scope of this invention to automatically start and stop motor 23 by means hereinafter described.

A cross-sectional elevated view of coupling means 29 is illustrated in FIGURE 4. Coupling means 29 is attached to shaft 19 by threaded screw members 50 extending through closure member 53 and into shaft 19. A threaded outer case member 51 threadably engages inner sleeve member 52, and sleeve member 52 is attached to closure member 53 by threaded screw members 54. Positioned within sleeve member 52 is a connecting member 56, preferably fabricated for reasons hereinafter apparent from a plastic material such as Teflon (tetrafluoroethylene), manufactured by E. I. du Pont de Nemours Company of Wilmington, Deleware, while the remaining coupling means 29 part members are preferably metallic, except as hereinafter otherwise described.

Conduit 21 extends through shaft 19, closure member 53 and into connecting member 56 where said conduit 21 is in communication with a channel 57 positioned within connecting member 56. To prevent the leakage of vapors from channel 57, a sealing member 58 such as a Parker O-ring manufactured by Parker Seal Company of Culver City, California, is positioned immediately adjacent to connecting member 56 and surrounding conduit 21.

A second connecting member 59 is positioned adjacent to and in constant contact with connecting member 56. A spring member 60, such as a Halogen wave spring, manufactured by Halogen Insulator and Seal Corporation, Franklin Park, Illinois, acting against connecting member 59 continuously maintains contact between connecting members 56 and 59. Channel 61 extending through connecting member 59 is in communication with channel 57 and conduit 46.

In operation, outer case member 51, sleeve member 52, closure member 53 and connecting member 56 rotate with the rotation of shaft 19. Connecting member 59 and conduit 46 do not rotate, thereby providing a means for transmitting vapors from the rotating conduit means to a stationary conduit means.

Referring again to FIGURE 1, the operation of the inventive apparatus will now be more fully described. As a vaporous constituent is passed to conduit inlet means 30, conduit means 28, and into column 20, shaft 19 is rotated and moved laterally away from container 10 by motor means 23. Column 20 is thus rotated and moved from heating compartment 11 warmed by electrical heating element 14 into compartment 17, compartment 17 containing a refrigerant capable of condensing the said vaporous constituent.

Assuming, for example, that the said vaporous constituent is being transmitted by a carrier gas, the refrigerant employed in compartment 17 must be capable of condensing the said vaporous constituent while permitting the carrier gas to pass from coil 20, through conduit 21, and from the storage vessel via conduit 46. The rotation and movement of coil 20 is synchronized with the passage of the said vaporous constituent to coil 20 so that the portion of coil 20 in which it is desired to store the said vaporous constituent is within compartment 17 prior to the passage thereto of the said vaporous constituent. The vaporous constituent is then condensed within coil 20, and coil 20 is then rotated and moved laterally to the right to a new position preparatory to receiving a second vaporous constituent, and the storing operation is repeated. Additional vaporous constituents can be stored within coil 20 by successive storing steps. Coil 20 is thus progressively cooled from the outlet to the inlet thereof in the storage of multiple vaporous constituents.

The condensed constituents can be transmitted from column 20 by passing a carrier gas through conduit means 46, conduit tube 21 and into column 20. The direction of rotation and lateral movement of shaft 19 is reversed and column 20 is rotated through opening 18, passing from compartment 12 to compartment 11. An electric current is passed to heater 31 and column 20 is progressively heated from the inlet to the outlet thereof as column 20 passes through heater 31. The condensed constituents are vaporized by heater 31 and are emitted separately from container 10 via conduit 28 and conduit inlet means 30.

Referring to FIGURES 6a and 6b, the effectiveness of the inventive apparatus to separately store multiple vaporous constituents and to transmit the said vaporous constituents from the storage vessel separately is illustrated. FIGURE 6a is a chromatogram of the peaks emitted from a conventional chromatographic analyzer upon the analysis of a fluid mixture containing the constituents propane (A), isobutane (B), normal butane (C), isobutene, trans-2-butene, butene-1 (D), butene-cis-2 (E), and normal pentane (F). With column 20 initially within compartment 11, shaft 19 was rotated slowly and moved laterally to the right. As the separated vaporous constituents were emitted from the conventional chromatographic analyzer, they were passed directly into storage vessel 10 and into rotating column 20. After all of the vaporous constituents had been passed into column 20 and condensed, the rotation and movement of shaft 19 and column 20 was halted.

The direction of rotation and lateral movement of shaft 19 was reversed and helium as a carrier gas was transmitted to column 20 via conduit means 46 and 21. An electric current was transmitted to heater 31 and as column 20 passed through heater 31, the previously condensed vaporous constituents were vaporized in the reverse order that they were stored. A conventional chromatographic detector and recorder was employed to measure a property of the vaporous constituents transmitted from storage vessel 10, which property was representative of the composition of the vaporous constituents. The resulting chromatograph produced is illustrated in FIGURE 6b. It is readily apparent upon comparison of FIGURES 6a and 6b that the separate vaporous constituents were stored within storage vessel 10 and transmitted therefrom without mixing. It is also readily apparent by comparison of FIGURES 6a and 6b that the separate vaporous constituents were stored within storage vessel 10 and transmitted therefrom without mixing. It is also readily apparent by comparison of FIGURES 6a and 6b that the effluent of the chromatographic analyzer can be stored indefinitely within storage vessel 10 and subsequently analyzed at a different location and at a later time by, for example, a mass spectrometer.

It is also within the scope of this invention to improve the resolution of successive chromatographic peaks by storing the peak eluted from a conventional chromatographic analyzer at spaced intervals within column 20. FIGURES 7a and 7b illustrate the effectiveness of employing the inventive storage vessel 10 to improve chromatographic peak resolution. FIGURE 7a illustrates a chromatograph obtained upon the transmission from a conventional chromatographic analyzer of separated vaporous constituents of two fluid mixtures. The first fluid mixture contained the constituents isobutane (b), normal butane (c), isobutene, trans-2-butene, butene-1 (d), butene-cis-2 (e), and normal pentane (f). The second fluid mixture contained the constituents propane (g), isobutane (h), normal butane (i), butene-cis-2 (j), isobutene, trans-2-butene, butene-1 (k), and normal pentane (l). As each constituent represented by a peak was passed from the conventional chromatographic analyzer into storage vessel 10, the peak was stored at a fixed point within column 20. Column 20 was then rotated and moved laterally prior to the admission of the next consecutive chromatographic peak into column 20. The next chromatographic peak was then stored at a fixed location within column 20, and column 20 was then rotated 90° and moved laterally prior to the admission of the next successive chromatographic peak. This operation was continued until all of the chromatographic peaks had been stored within column 20.

The direction of rotation and lateral movement of column 20 was then reversed and the previously condensed vaporous constituents vaporized in the manner heretofore described with respect to FIGURE 6b. As the vaporous constituents were transmitted from storage vessel 10 and a property of the said constituents measured in the previously described manner, the chromatogram illustrated in FIGURE 7b was produced. By comparison of FIGURES 7a and 7b, it is readily apparent that increased separation between successive constituents of the chromatographic analyzer effluent has been effected. The exact identification of each of the vaporous constituents can thus be more readily determined by analysis of the effluent from storage vessel 10 using a mass spectrometer than from the analysis of the effluent from the conventional chromatographic analyzer employing a mass spectrometer. The concentration of each of the components in the carrier gas has been increased in FIGURE 7b compared to the concentration of the individual components in the carrier gas effluent from the chromatographic analyzer illustrated in FIGURE 7a. The mass spectra taken during the passage of the higher concentration will provide better spectra for a qualitative identification of the individual components or constituents. The broader peaks as illustrated in FIGURE 7a are quite often too weak for effective analysis by the mass spectrometer. Comparison of FIGURES 7a and 7b illustrates that quantitative measurements of each of the components or constituents in the effluent from storage vessel 10 can be more readily determined.

The numbers appearing at the top of the peaks in FIGURES 7a and 7b are the attenuation factors employed. The extra peaks occurring between peaks c and d and between i and j of FIGURE 7a are due to substantial changes in sensitivity of the recording instrument. Curve irregularities such as occurring between peaks k and j and between e and d of FIGURE 7b are due to balancing and repositioning the instrument.

As previously noted, it is within the scope of this invention to start and stop motor 23 manually or automatically. FIGURE 5 illustrates schematically one method of automatic control whereby a conventional chromatographic analyzer recorder 50 is employed to control the positioning of column 20 within the storage container 10. Recorder 50 repositions switch 51 responsive to signals transmitted to recorder 50 and recorded on the chromatograph recording chart. Switch 51 is operably connected to a conventional cam switch 52 positioned adjacent indexing means 43 (FIGURE 3).

Cam switch 52 is positioned by indexing pegs 57 placed about the periphery of indexing means 43. Cam switch 52 is operably connected to motor means 23.

An electrical current is transmitted to control box 53 via lead wires 56. Control box 53 is connected to switch 51 and to motor means 23 through limit switches 42 and 45. Control box 53 can also be directly connected to motor 23 via manual by-pass switch 54.

In operation, as point a of the chromatogram is recorded, a signal is transmitted to switch 51, repositioning switch 51 in position a'. As illustrated, switch 52 is in position 1'. Upon the positioning of switch 51 in the a' position, the circuit between control box 53 and motor means 23 is complete, thereby actuating motor means 23. Motor means 23 rotates shaft 19 until the indexing peg 57 at position 9' of indexing means 43 is brought into contact with cam switch 52.

At this point, cam switch 52 is repositioned in position 9', breaking the circuit and deactivating motor means 23. The vaporous constituent represented by the chromatographic peak a–b is passed into column 20 at this point. When point b of the peak is reached, switch 51 is moved to the b' position. Again the circuit is complete and motor means 23 rotates shaft 19 180° until indexing peg 57 at position 1' of indexing means 43 is brought into contact with cam switch 52. At this point cam switch 52 is moved to position 1'. Again the circuit is broken and motor means 23 is deactivated. The sequence of operations is repeated when point a of the next succeeding chromatographic peak is recorded by recorder 50.

As illustrated in FIGURE 5, if indexing means 43 is brought into contact with either of limit switches 42 or 46, the circuit is broken and motor means 23 is deactivated. Manual by-pass switch 54 provides a means of manually starting and stopping motor means 23.

The direction of rotation and lateral movement of shaft 19 by motor means 23 is manually controlled by a means not illustrated in FIGURE 5.

As will be evident to those skilled in the art, various modifications may be made or followed in view of the foregoing disclosure and discussion without departing from the spirit or scope thereof.

I claim:

1. Apparatus comprising a container partitioned so as to provide a first compartment and a second compartment within said container, a column containing an inert packing material positioned within said container, means for moving said column from said first compartment to said second compartment and for moving said column from said second compartment to said first compartment, and means for progressively cooling said column as said column is moved from said first compartment to said second compartment.

2. The apparatus of claim 1 to include means for progressively heating said column as said column is moved from said second compartment to said first compartment.

3. The apparatus of claim 2 wherein said means for moving includes means for automatically manipulating the position of said column within said first and second compartments responsive to a signal representative of the transmission of a vaporous constituent.

4. Apparatus comprising a container partitioned so as to provide a first compartment and a second compartment within said container, a helical-shaped column containing an inert packing material positioned within said container, means for moving said column from said first compartment to said second compartment and for moving said column from said second compartment to said first compartment, means for heating said first compartment, and means for progressively cooling said column as said column is moved from said first compartment to said second compartment.

5. The apparatus of claim 4 wherein said means for moving comprises means for rotating said helical-shaped column and repositioning said column laterally.

6. The apparatus of claim 5 to include means for automatically limiting the lateral repositioning of said column.

7. The apparatus of claim 6 to include means for progressively heating said column as said column is moved from said second compartment to said first compartment.

8. The apparatus of claim 7 to include first conduit means connected to and in communication with the inlet of said column, and second conduit means connected to and in communication with the outlet of said column, each of said first and second conduit means including means for coupling comprising a rotatable member operably connected to and in communication with said column, and a non-rotatable member adjacent to and in direct communication with said rotatable member.

9. A method of isolating and storing multiple vaporous constituents in a storage zone containing an inert material throughout the length of said storage zone after the elution of said components in spaced sequence from a chromatographic separation column which comprises passing each of said vaporous constituents separately and sequentially into the inlet of the said storage zone, and during the passage of said vaporous constituents into the storage zone cooling said storage zone to a uniform temperature progressively from the outlet of said storage zone to the inlet until the said storage zone reaches a uniform temperature below the condensation temperature of each of the said constituents so as to sequentially condense each of the said constituents in said inert packing material and prevent the mixing of said vaporous constituents.

10. The method of claim 9 to include subsequently heating said storage zone progressively from the inlet thereof to the outlet thereof, and passing a carrier gas through said storage zone from the outlet to the inlet thereof.

11. The method of claim 10 wherein said storage zone is progressively cooled by passing said storage zone into a cooling zone maintained at a uniform temperature, and said storage zone is subsequently heated by passing said storage zone through a heating zone.

References Cited by the Examiner

UNITED STATES PATENTS

| 2,628,892 | 2/1953 | Reid | 165—86 X |
| 2,891,630 | 6/1959 | Hall et al. | 55—197 |
| 3,016,107 | 1/1962 | Strange et al. | 55—67 |
| 3,053,077 | 8/1962 | Tracht. | |
| 3,069,176 | 12/1962 | Woodcock et al. | 277—74 |
| 3,070,377 | 12/1962 | Eickmann | 277—74 |

FOREIGN PATENTS 860,406    2/1961    Great Britain.

MEYER PERLIN, *Primary Examiner.*

REUBEN FRIEDMAN, ROBERT A. O'LEARY,
*Examiners.*

N. R. WILSON, *Assistant Examiner.*